(12) United States Patent
Coward

(10) Patent No.: US 12,227,945 B2
(45) Date of Patent: Feb. 18, 2025

(54) STRUCTURAL TRUSS, ASSEMBLY AND METHOD OF MANUFACTURE

(71) Applicant: NET ZERO PROJECTS LIMITED, Marlow (GB)

(72) Inventor: Andrew Robert Coward, Copenhagen (DK)

(73) Assignee: NET ZERO PROJECTS LIMITED, Marlow (GB)

( * ) Notice: Subject to any disclaimer, the term of this patent is extended or adjusted under 35 U.S.C. 154(b) by 43 days.

(21) Appl. No.: 18/002,927

(22) PCT Filed: Jun. 21, 2021

(86) PCT No.: PCT/GB2021/051562
§ 371 (c)(1),
(2) Date: Dec. 22, 2022

(87) PCT Pub. No.: WO2021/260354
PCT Pub. Date: Dec. 30, 2021

(65) Prior Publication Data
US 2023/0235557 A1    Jul. 27, 2023

(30) Foreign Application Priority Data

Jun. 24, 2020    (GB) ...................................... 2009632

(51) Int. Cl.
*E04C 3/20*    (2006.01)
*B33Y 10/00*    (2015.01)
(Continued)

(52) U.S. Cl.
CPC .............. *E04C 3/205* (2013.01); *B33Y 10/00* (2014.12); *E04C 3/293* (2013.01); *B33Y 70/00* (2014.12)

(58) Field of Classification Search
CPC ......... E04C 3/205; E04C 3/293; B33Y 10/00; B33Y 70/00
See application file for complete search history.

(56) References Cited

U.S. PATENT DOCUMENTS 3,398,498 A    8/1968    Krauss
6,065,257 A *  5/2000    Nacey ..................... E01D 19/16
                                                52/223.14
(Continued)

FOREIGN PATENT DOCUMENTS

CA    2114263 A1    7/1995
CN    107059593 A    8/2017
(Continued)

*Primary Examiner* — Mark R Wendell
(74) *Attorney, Agent, or Firm* — Craft Chu PLLC; Andrew W. Chu

(57) ABSTRACT

There is a truss structure, assembly and method of manufacturing a truss with a span L and a beam depth H. The truss having a main part includes a substantially planar top chord with a longitudinal centerline and webs connecting between the top chord and a bottom chord. The top chord is separated from the bottom chord by the webs. There is a top chord node where each web intersects with the centerline of the top chord and a bottom chord node where each web meets the bottom chord. At least two of the top chord nodes coincide with one another along the top chord. In use, the elements of the main part are in compression and the bottom chord includes a tension member.

19 Claims, 18 Drawing Sheets

(51) Int. Cl.
*E04C 3/293* (2006.01)
*B33Y 70/00* (2020.01)

(56) References Cited

U.S. PATENT DOCUMENTS

| | | | |
|---|---|---|---|
| 8,020,235 B2* | 9/2011 | Grace | E01D 2/02 14/78 |
| 8,590,084 B2* | 11/2013 | de la Chevrotiere | E01D 6/00 14/4 |
| 9,309,634 B2* | 4/2016 | Grace | E01D 2/02 |
| 2021/0340766 A1* | 11/2021 | Poutanen | E04C 3/16 |

FOREIGN PATENT DOCUMENTS

| | | |
|---|---|---|
| CN | 109129818 A | 1/2019 |
| CN | 110774407 A | 2/2020 |
| JP | 2001182016 A | 7/2001 |
| WO | 2018015920 A1 | 1/2018 |

* cited by examiner (prior art – common truss geometries)

(prior art – Warren truss geometries)

(prior art – roof truss geometries)

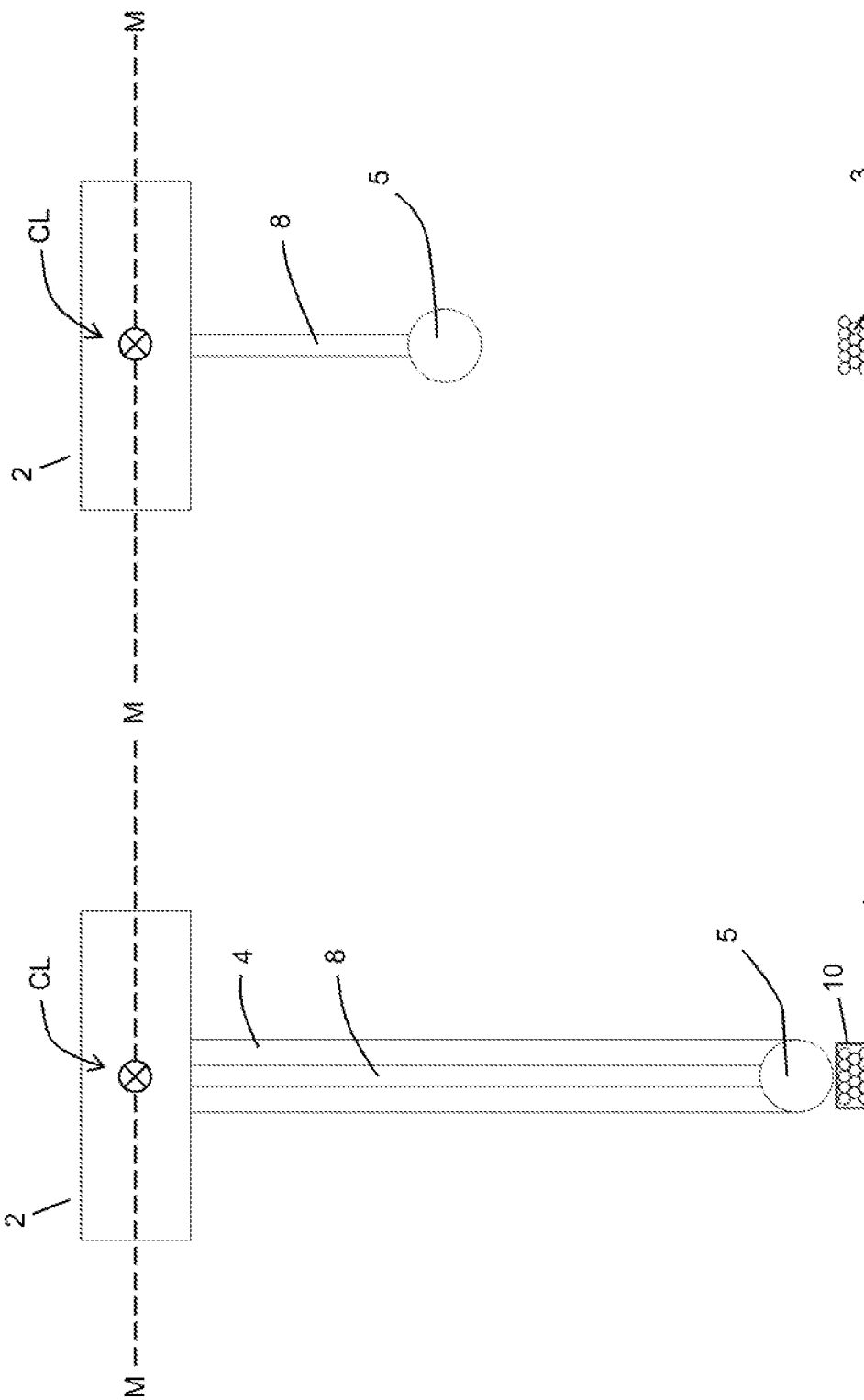

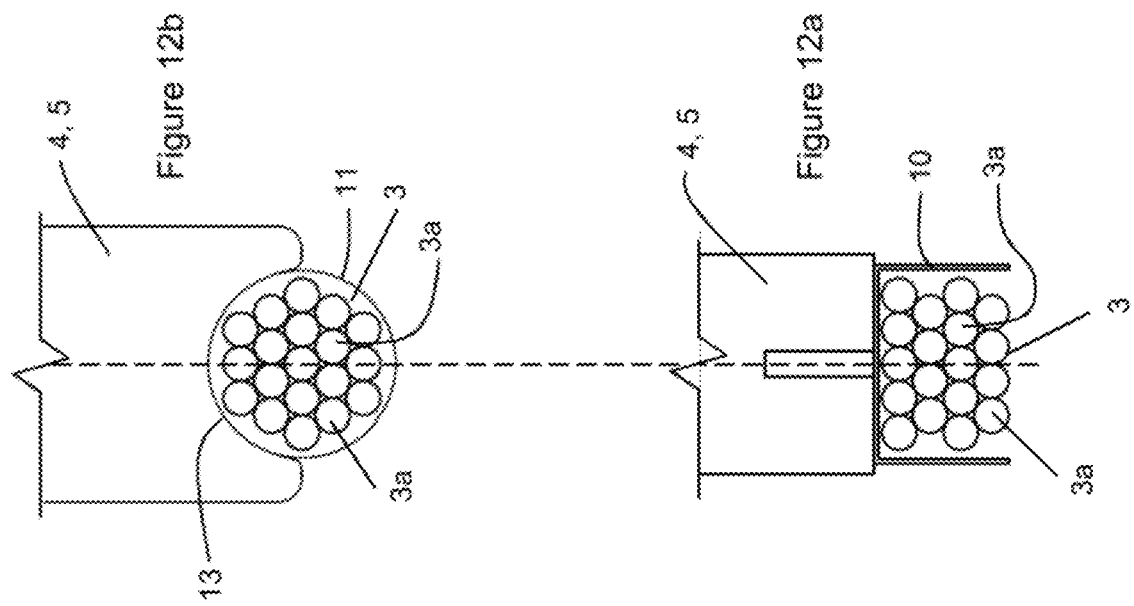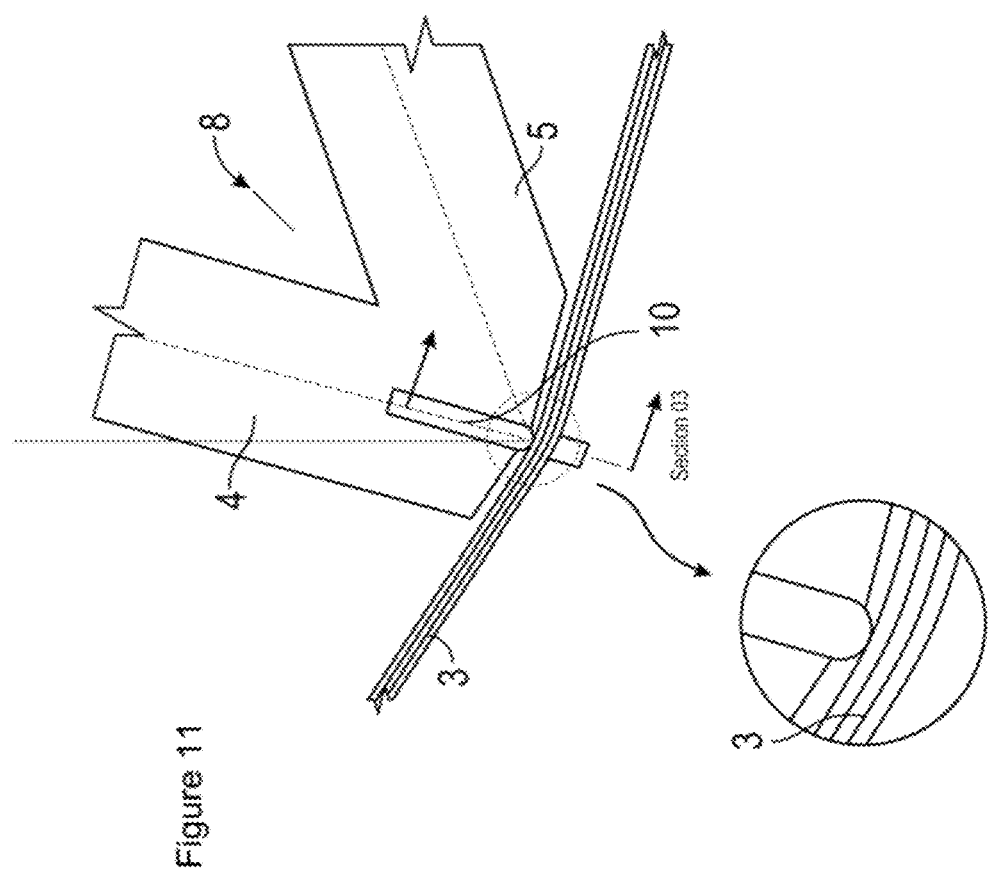

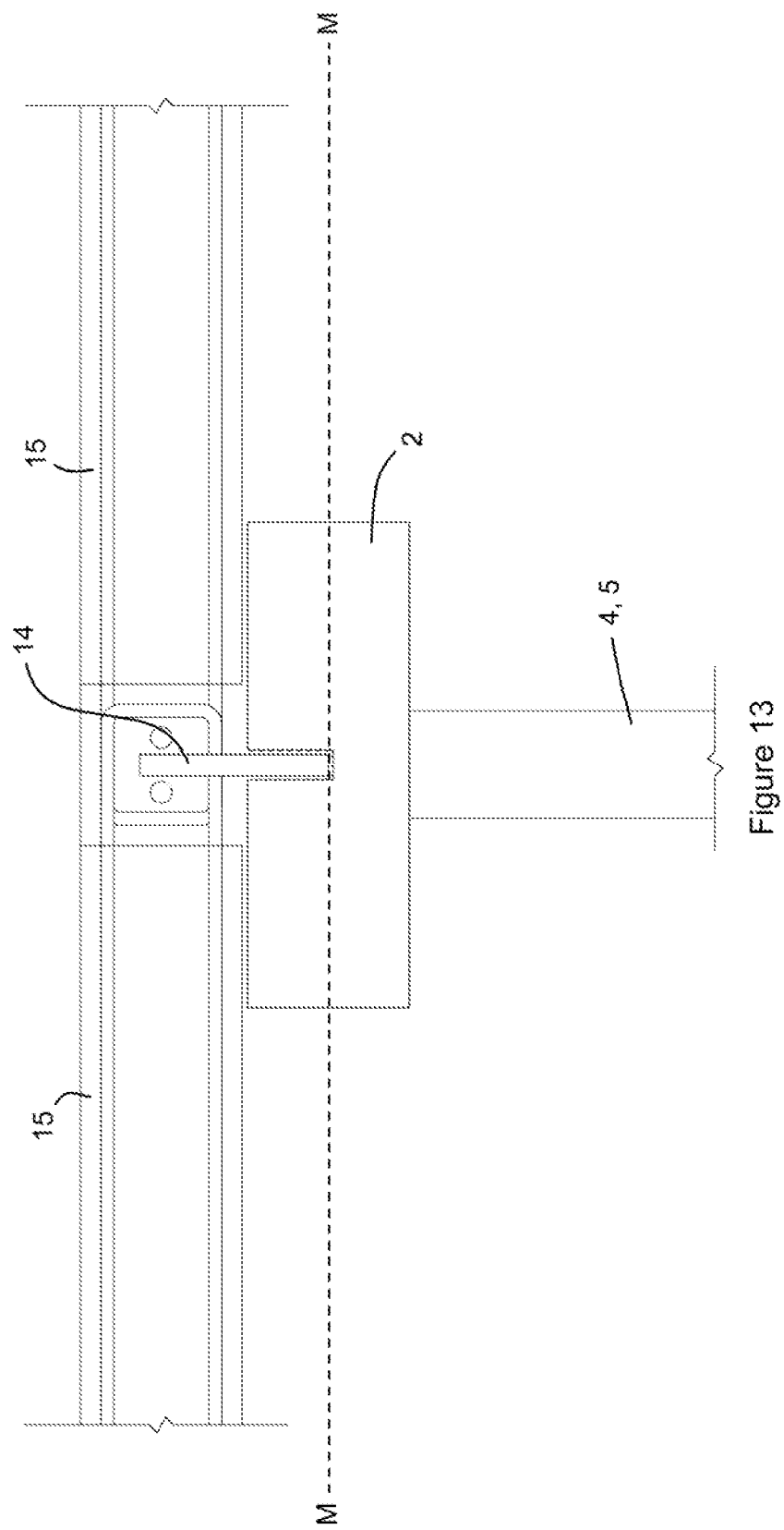

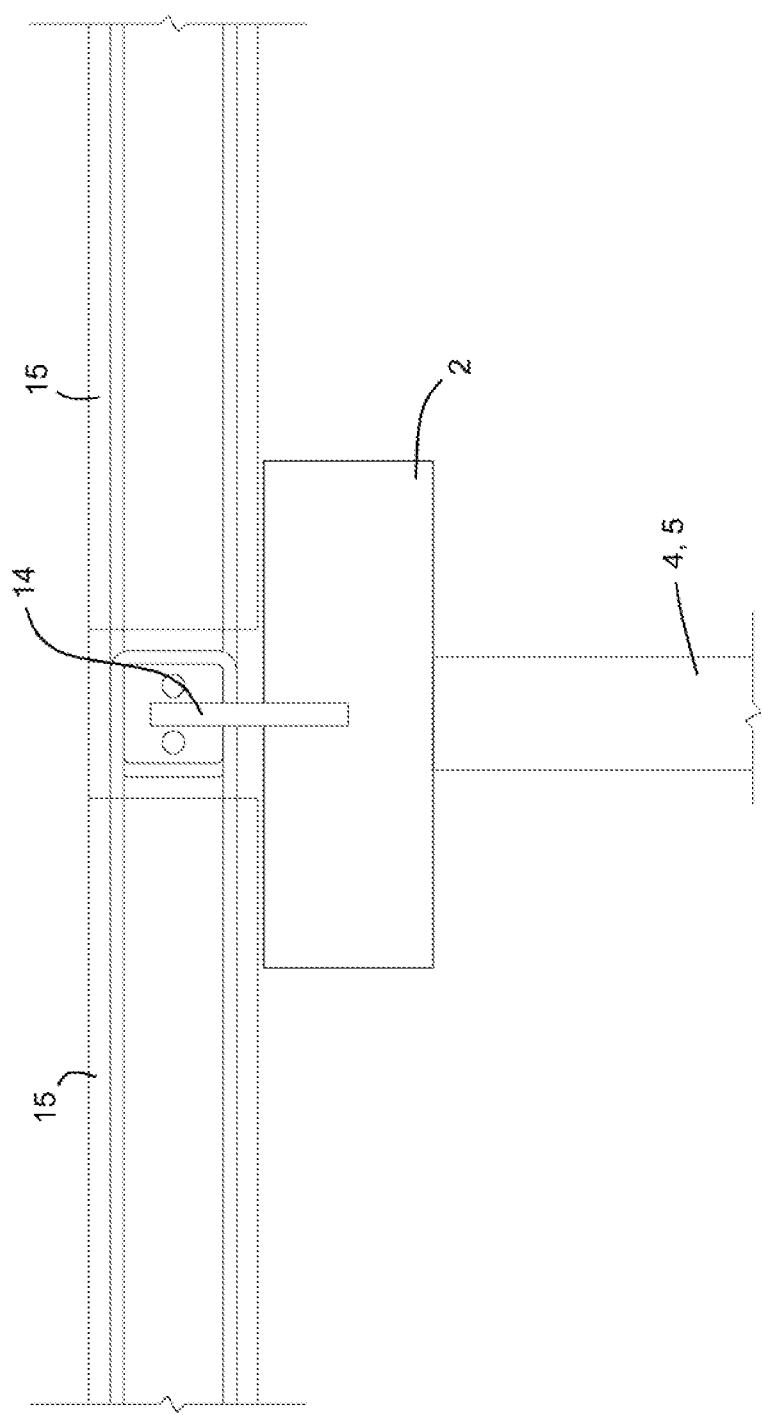

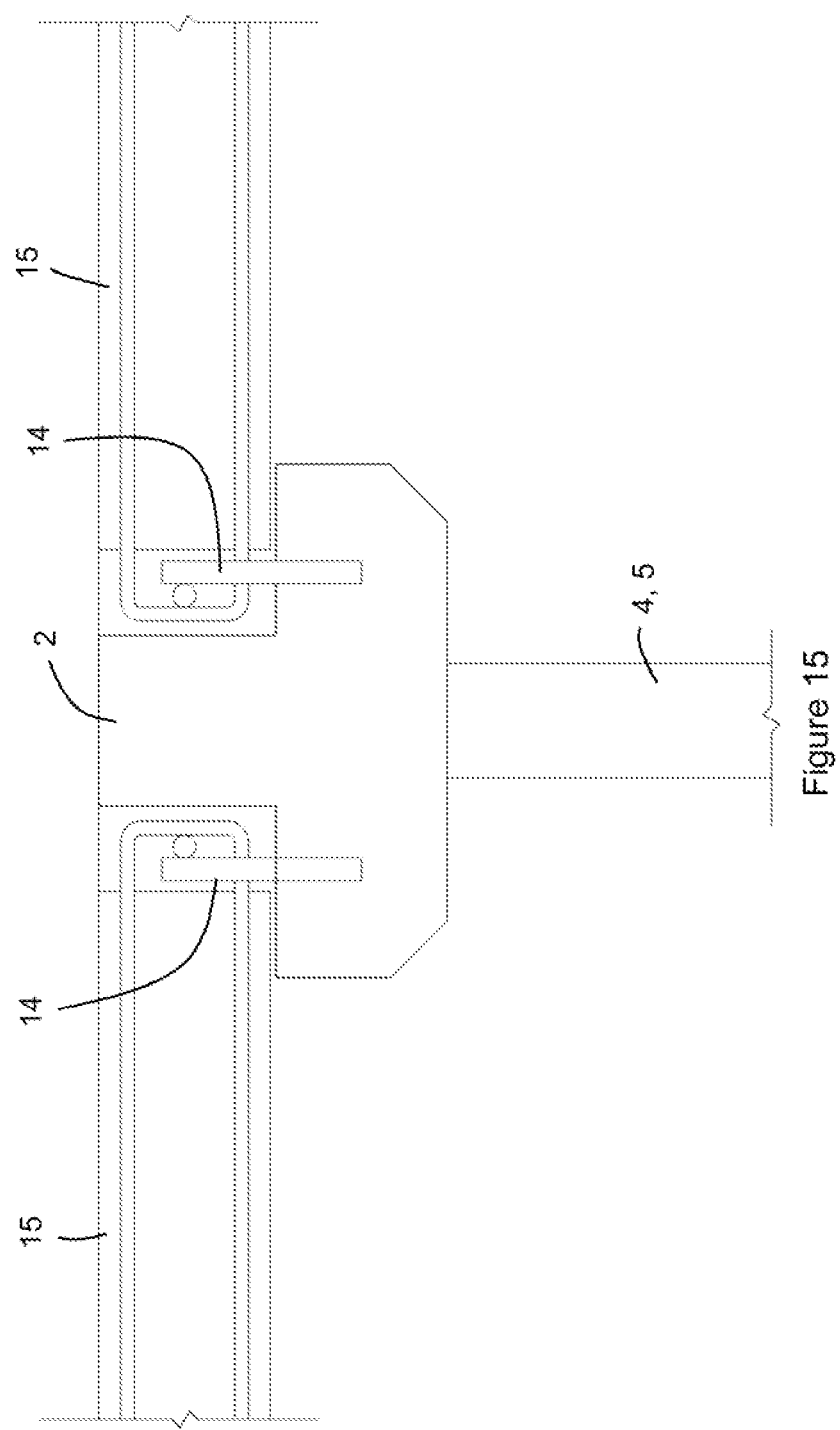

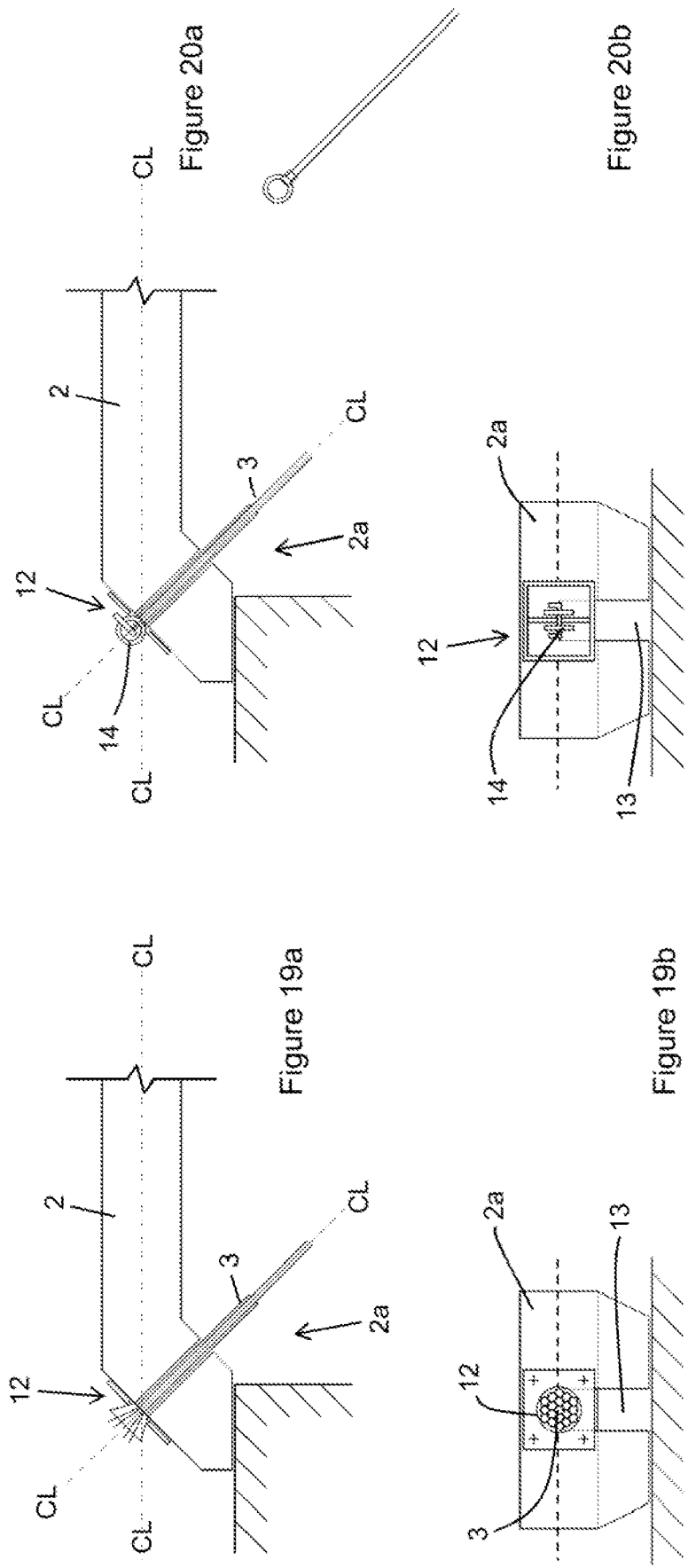

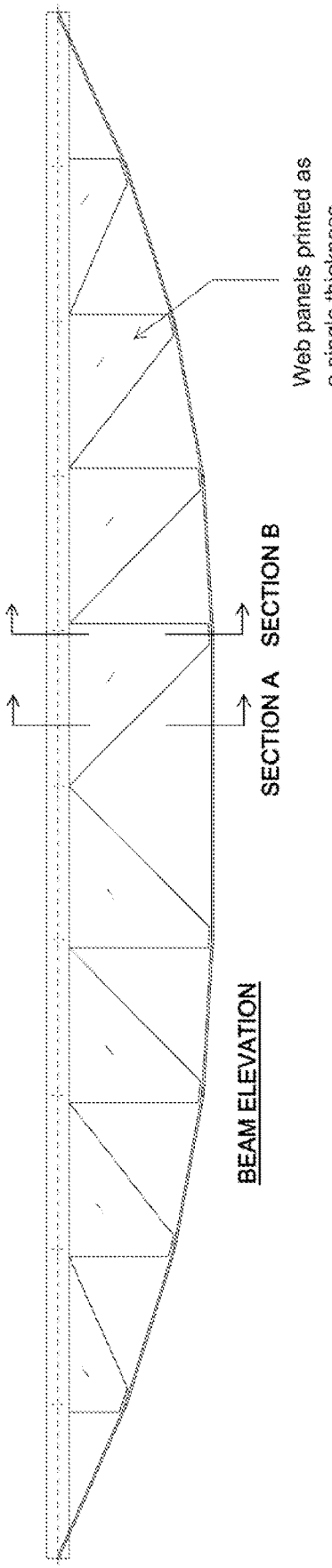
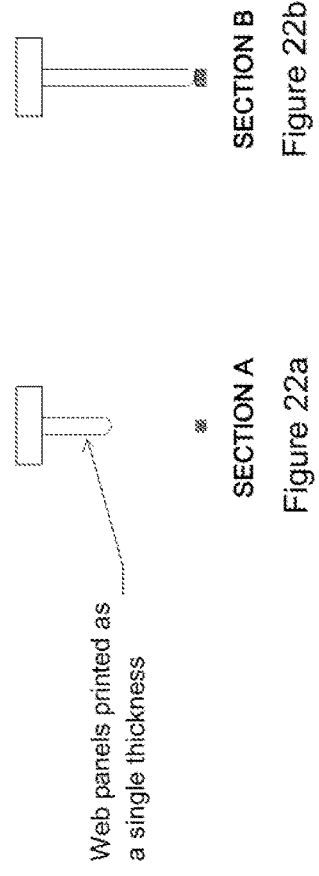
Figure 21
Figure 22a — SECTION A
Figure 22b — SECTION B

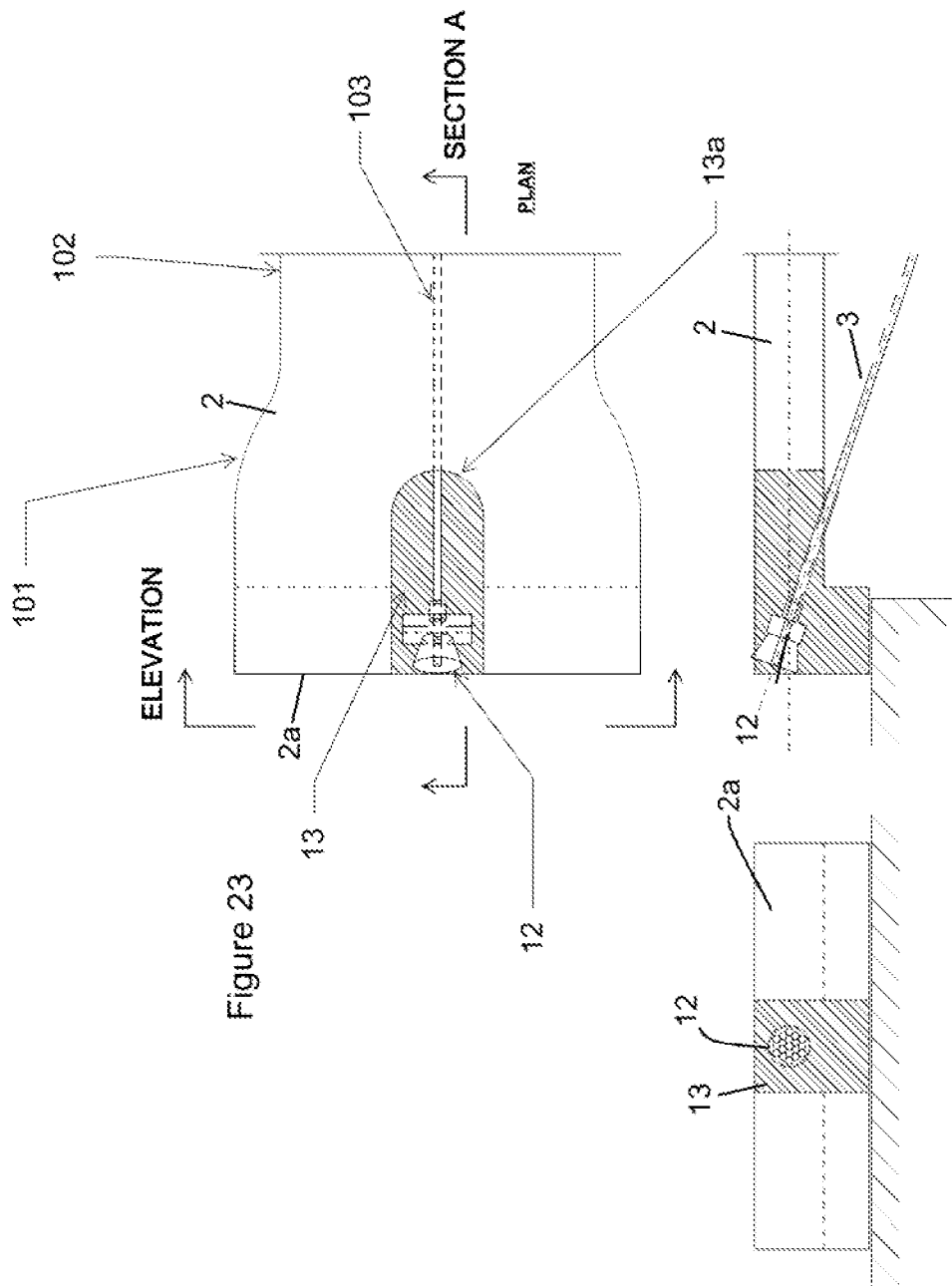

STRUCTURAL TRUSS, ASSEMBLY AND METHOD OF MANUFACTURE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

This invention relates to structural trusses, assemblies and methods of manufacture.

2. Description of Related Art Including Information Disclosed Under 37 CFR 1.97 and 37 CFR 1.98

Concrete is a common construction material that is generally low in cost. It is strong in compression and weak in tension. When combined with steel reinforcing bars to make reinforced concrete (RC), the composite material can be strong in both tension (for flexural resistance) and compression.

Concrete is rarely used in trusses but is very commonly used in beams. It is rarely used in trusses because trusses typically require tensile strength as well as compressive strength. When a reinforced concrete member is put into pure tension, the concrete must crack to engage the tensile strength of the steel, so there can often be problems with corrosion protection and maintenance. Also, the formwork and placement of reinforcement in concrete trusses is costly and labor intensive.

Trusses can span from columns or walls and support slabs. In countries where the material costs are lower than the labor costs, e.g. Great Britain, the design of RC beams is focused on minimizing labor costs. This typically results in uniform rectangular beam cross-sections which are simple to build but do not necessarily minimize the quantity of material used.

Steel reinforced concrete trusses are possible and there are examples in bridge construction from the 20th century. The tension capacity is provided by the steel reinforcement within the concrete. However, they are relatively unusual due to their high cost of manufacture. They are also only applicable to large bridge spans (20 m to 50 m, say) because of the fact that forming reinforced concrete elements is not practical below a certain size or thickness. In one example, the smallest thickness incorporating two layers of reinforcement is 150 mm. Therefore, the web members would be limited to minimum 150 mm×150 mm, far in excess of what might be required in a beam for a typical span in a building. These concrete trusses would follow the principles of steel trusses and require the web members to resist tension or compression.

The field of 3D printed concrete can reduce manual labor input and costs by forming the RC beams by using robotics. In principle, any geometry can be created at no additional cost, which means that the cost of a 3D printed beam is directly related to the efficiency of the geometry and therefore the quantity of material. However, for a beam to resist bending, it must still have some tension capacity regardless of the method of manufacture. It is not currently possible to 3D print reinforced concrete because there is no way to print the steel reinforcing bars inside the concrete or during the concrete printing. There are examples of printing layers of concrete and having a person (or a second robot) lay a piece of reinforcing steel in between the layers before the printer head returns to the original location but this is slow, imprecise and interrupts the printing process which can bring its own disadvantages. Therefore, 3D printed concrete remains a technique that is useful for compression-only structures, such as walls, arches and, in some cases, columns.

3D printing with concrete: printing concrete without aggregates is easier because the fluid is easier to control and print and a smaller printer nozzle size can be used (no large particles), yielding a higher print resolution. Concrete without aggregates should be described as mortar. If aggregates are included in the mix, the material is a true concrete, but this does place limitations on the size of the printer nozzle and the resolution of the printed element.

FIGS. 1a-d of the accompanying drawings show examples of truss and beam structures.

FIG. 1a is a pedestrian bridge spanning 34 m i.e., much further than a typical building beam. Both the bottom and top chords are curved. In this scenario, the web members are connected in an inverted pyramid arrangement and the web members are struts which are only resisting compression. The bottom chord is steel cable. The top chord is pieces of granite strung together on the pre-stress cable and then pulled tight. The top chord nodes are spaced apart from one another. This is possible because the web members are not transferring shear in the normal way. Their purpose is to maintain a given distance between the top and bottom chords. In this arrangement, there must be a horizontal line of symmetry i.e., the curvature of the top chord must be the inverse of the bottom chord. There is pre-stress in the top chord, to equally oppose the stress in the bottom chord, otherwise the arrangement is not stiff enough to act as a structural member.

FIG. 1b is a demonstration prototype printed by VERTICO in The Netherlands. It is a 3D printed segmental, post-tensioned beam. The pieces of the beam are each printed as a column vertically with voids to receive reinforcement steels within the top and bottom chords. The pieces are connected together by pre-stressing in both the top chord and the bottom chord.

FIG. 1c of the accompanying drawings shows a 3D printed truss from the research group at University of Napoli. A traditional Howe truss arrangement is printed in segments, bay by bay. The segments are then connected together using external post-tensioned steel rods. The bottom chord is concrete, and a series of inclined steel ties are provided externally for post-tensioning.

FIG. 1d is a schematic side view of a so-called constant force truss as described, for example, in "Geometry-based Understanding of Structures" article in Journal of the International Association for Shell and Spatial Structures—December 2012. The truss does not use vertical and diagonal web members, it is not able to resist loads significantly different to those specifically designed for (e.g., a uniform load on only half the truss, or a point load at any location would cause large deflections).

The steel construction industry is a good reference for designing bending structures with a minimum of material. Steel has always been an expensive material, so the history of steel construction follows the development of different techniques for creating bending structures with stiffness, strength but minimum mass. One technique is to use a truss geometry, where the material is positioned where it can be most effective. This creates a bending structure which is able to resist loads through the components being either in axial tension or compression. Under gravity loads, a truss has a top chord in compression, a bottom chord in tension and web members separating the two chords in either tension or compression.

Some typical truss examples are:
The Warren truss, where the web members are diagonals in alternating tension and compression
The Pratt truss, where the web members are a vertical in compression and a diagonal in tension
The Howe truss, where the web members are a vertical in tension and a diagonal in compression.

In most cases, both the top and bottom chords are horizontal meaning that the material used for the truss must be capable of resisting both tension and compression. In some cases, the chords are not horizontal: truss bridges have often been built with curved top chords, to become a hybrid between a truss and an arch. Roof trusses in buildings often have sloped top chords.

It is not at present possible to benefit from a 3D concrete printing process to print a truss structure because the resultant structure is unable to provide a bending structure due to the inability to incorporate the steel reinforcing bars in the concrete structure without interrupting the printing process: the reinforcing bars are necessary to resist the tension loads present in some of the structural elements.

BRIEF SUMMARY OF THE INVENTION

The present invention provides a truss, assembly and method of manufacture according to the accompanying claims.

BRIEF DESCRIPTION OF THE SEVERAL VIEWS OF THE DRAWINGS

In order that the present invention can be more readily understood, embodiments thereof will now be described, by way of example, with reference to and as shown in the accompanying drawings.

FIG. 9 is a cross section view of section 01 of FIG. 7.

FIG. 10 is a cross section view of section 02 of FIG. 7.

FIG. 11 is a side elevation view detail of the truss of FIG. 7.

FIG. 12a is a cross section view of section 03 of FIG. 11.

FIG. 12b is a cross section view of a web end of another truss embodying the present invention.

FIGS. 13-15 are sectional views through a top chord of trusses embodying the invention with slabs aligned perpendicular to the axis of the trusses, the slabs being connected to the trusses.

FIG. 19a is a sectional view of one end of a truss embodying the present invention.

FIG. 19b is an end elevation view of the truss of FIG. 19a.

FIG. 20a is a sectional view of one end of a truss embodying the present invention.

FIG. 20b is an end elevation view of the truss of FIG. 20a.

FIG. 21 is a side elevation view of a truss embodying the present invention.

FIGS. 22a and 22b are sectional views of the truss of FIG. 21.

FIG. 23 is a top plan view of one end of a truss embodying the present invention.

FIG. 24a is an elevation view of the truss of FIG. 23.

FIG. 24b is a sectional view of the truss of FIG. 23.

DETAILED DESCRIPTION OF THE INVENTION

The present invention relates to trusses or beams, assemblies incorporating such trusses and methods of manufacture.

Overview

Figure 1A:
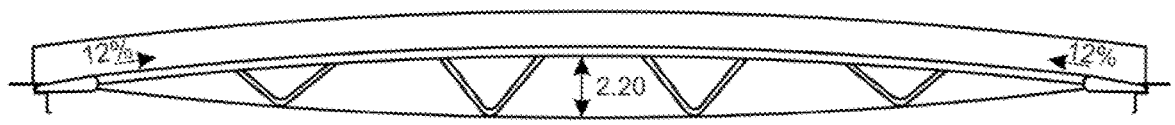
FIGS. 1a-d and 2-4 show schematic views of prior art and background trusses not according to the invention.
Figure 1B:
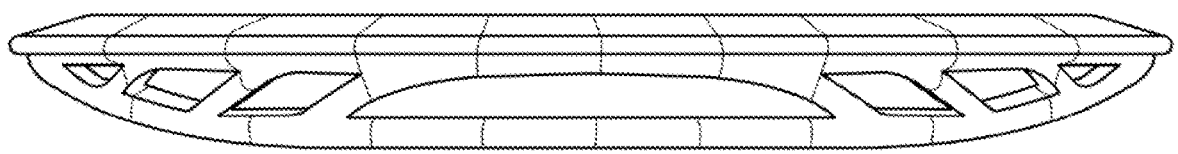
Figure 1C:
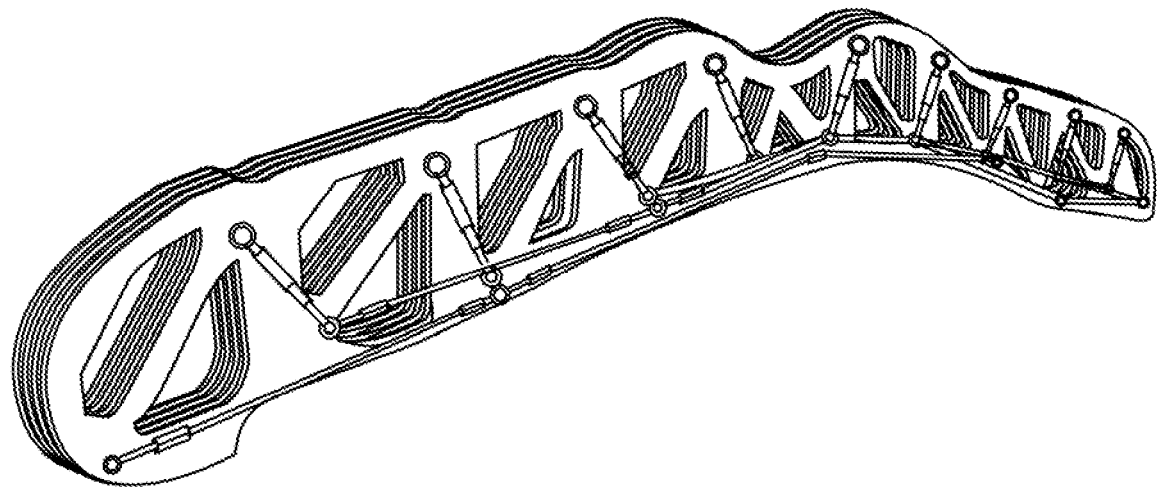
Figure 1D:
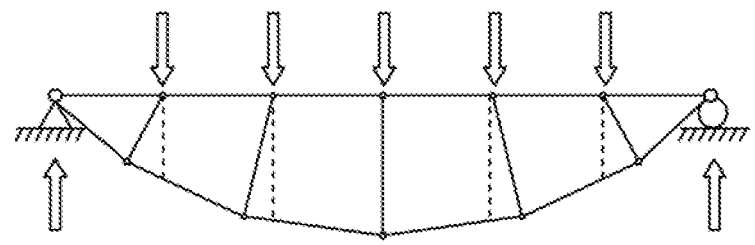
Figure 2:
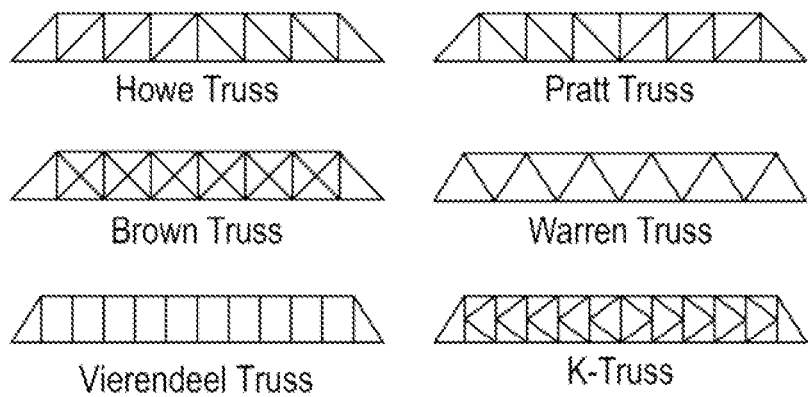
Figure 3:
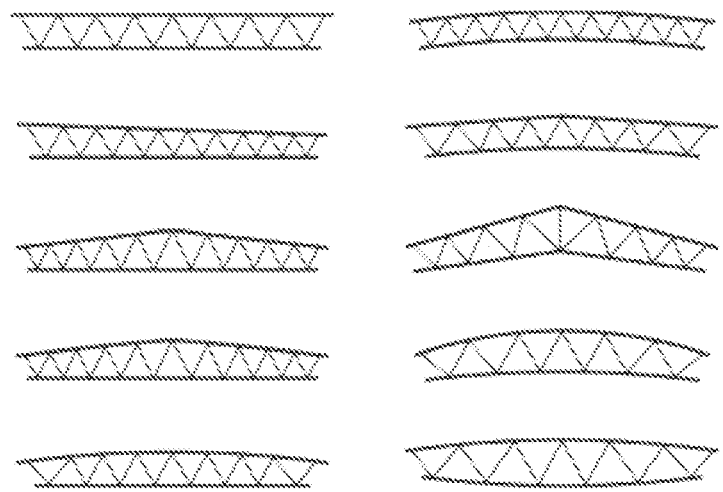
Figure 4:
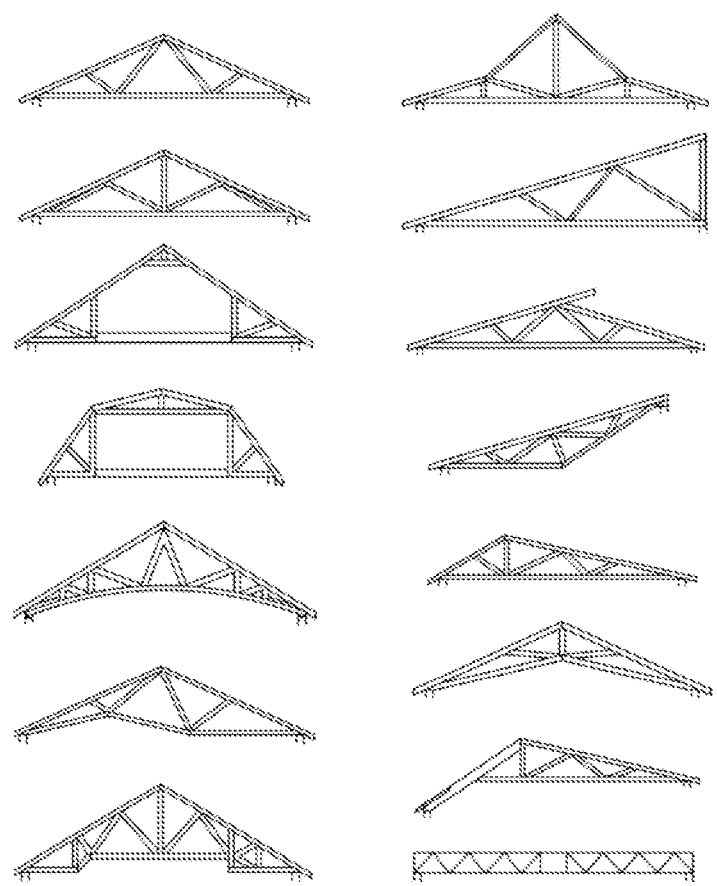
Figure 5:
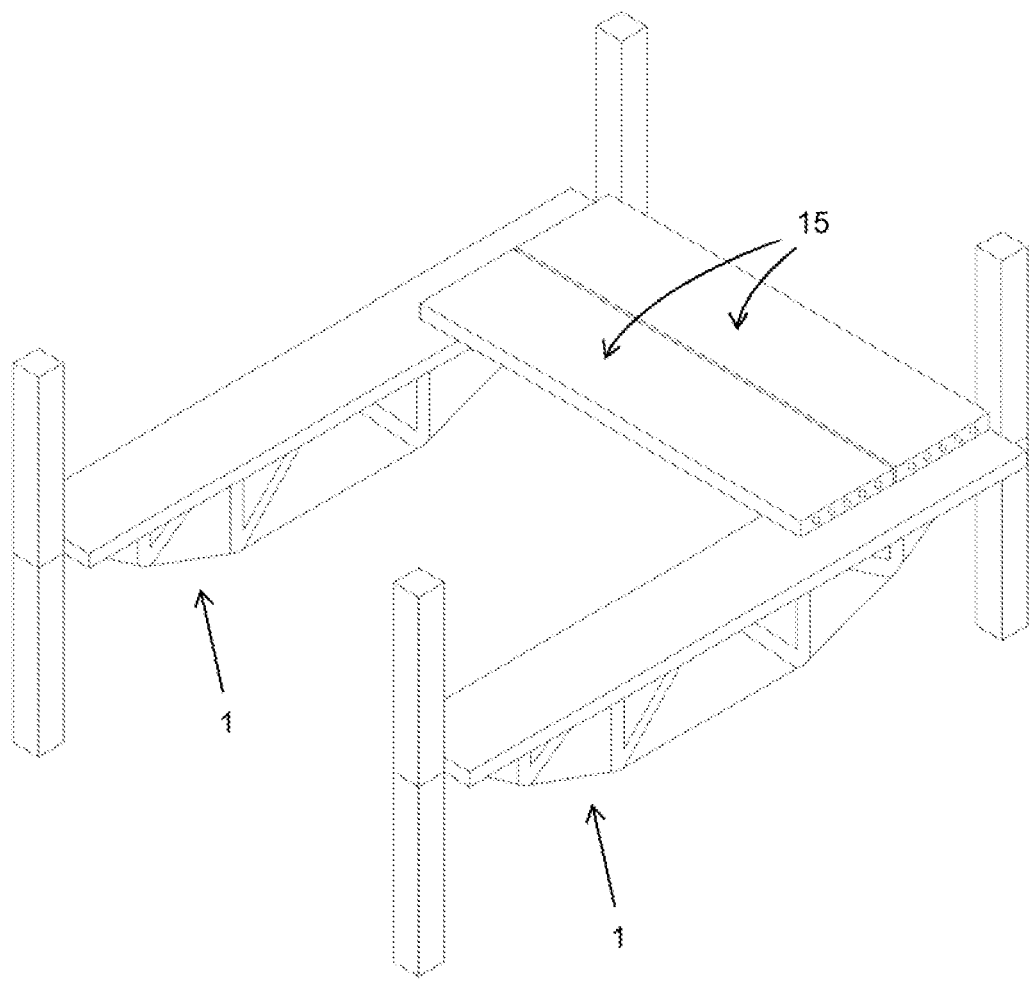
FIG. 5 is an isometric view of an assembly embodying the present invention utilizing a pair of trusses.
Figure 6:
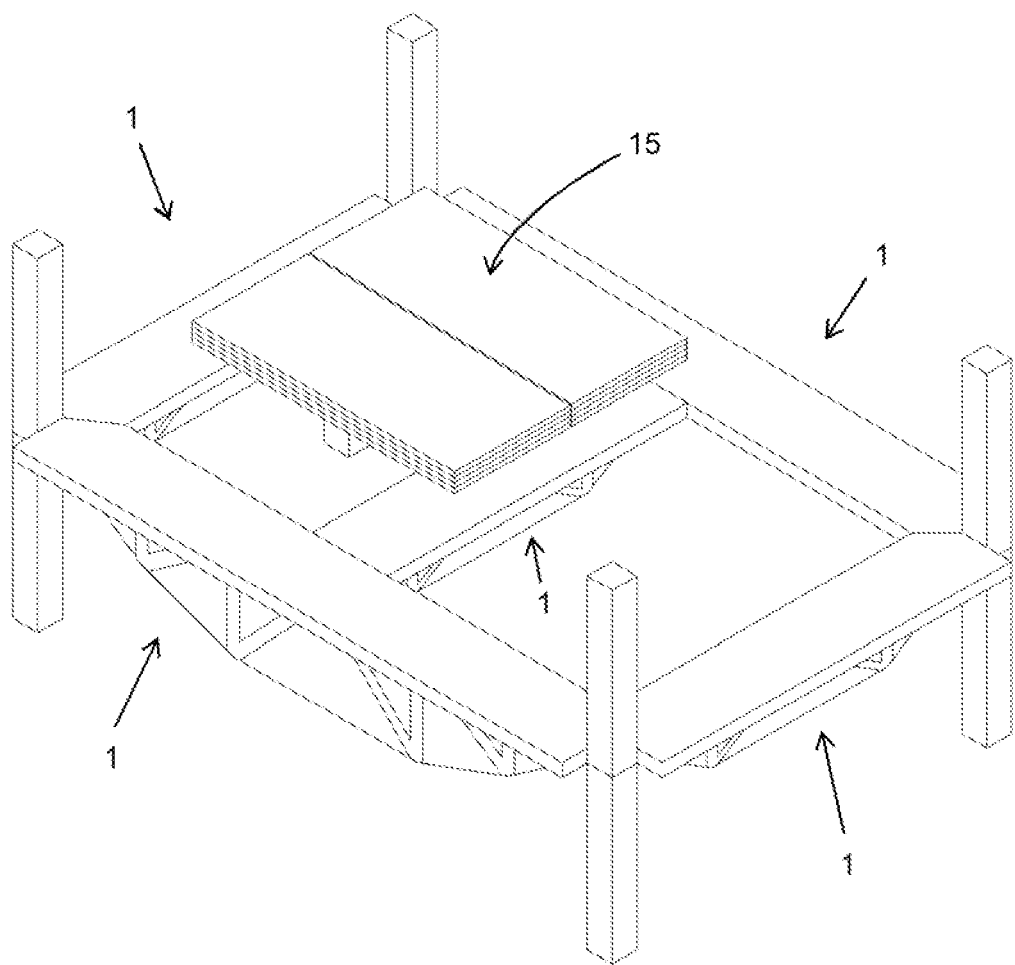
FIG. 6 is an isometric view of an assembly embodying the present invention utilizing five trusses.

FIGS. 5 and 6 are assemblies embodying the present invention comprising trusses 1 embodying the present invention deployed in a building and spanning the building columns.

Figure 7:
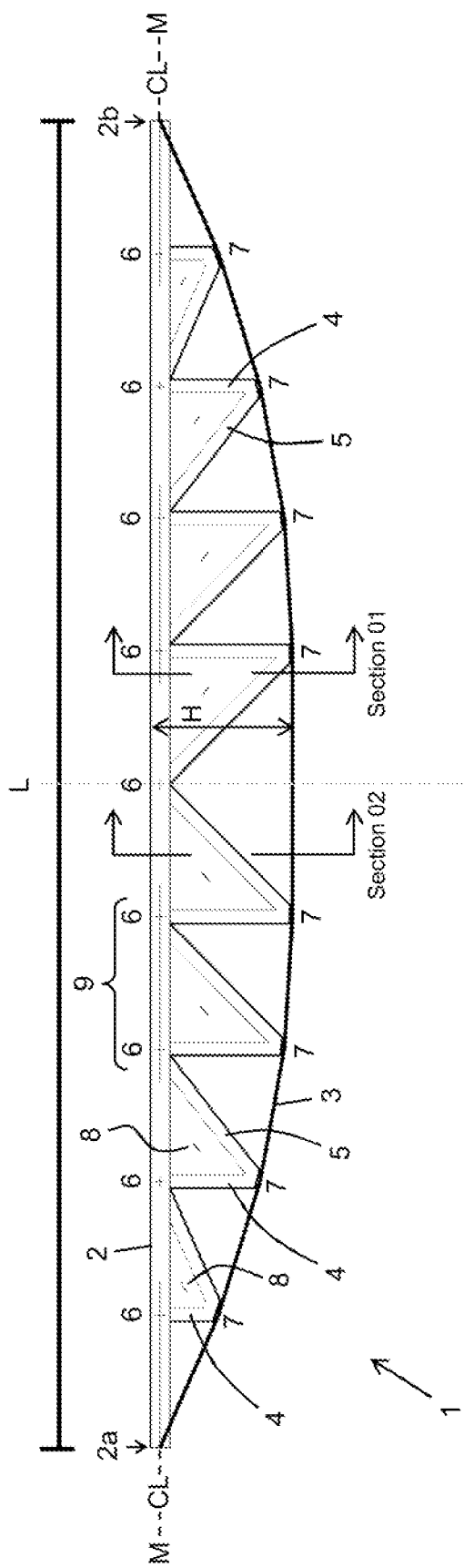
FIG. 7 is a side elevation view of a truss embodying the present invention.

Referring to FIG. 7, a truss 1 having a span L and beam depth H comprises a bending structure which is able to resist loads through the structural elements of the truss being either in axial tension or compression. The structural elements of the truss are a planar top chord 2 which, in use, is in compression, a bottom chord 3 which, in use, is in tension and web members 4,5 which separate the two chords 2,3 and which are, in use, in compression only. The main part of the truss 1 is composed of the top chord 2 and webs connecting between the top chord and a bottom chord, the top chord being separated from the bottom chord by the webs—this arrangement of geometry forces the web members to be in compression, thereby allowing the web members 4,5 to be 3D printed without reinforcement.

The Main Part

The top chord 2 is a planar rectangular section (see FIGS. 9 and 10), i.e., a block of concrete that would lie substantially flat or horizontal on a level surface when upside-down from the condition shown in FIG. 7. The top chord 2 has a longitudinal centerline CL and a main plane M of the top chord 2 lies along the centerline CL, into and out of the paper in FIG. 7. There should not be any steps or angles along the length of the top chord. The top chord 2 can be shaped in section—FIG. 9 shows a rectangular section.

The truss 1 has nodes where the respective chords 2,3 and webs 4,5 meet. There is at least one top chord node 6 where the centerline of the top chord 2 meets one of the webs 4,5 and at least one bottom chord node 7 where a centerline of the bottom chord 3 meets one of the webs 4,5. Importantly, apart from the end top chord nodes 6, respective pairs of top chord nodes 6 are coincident in that they coincide with one another at the centerline of the top chord 2.

The bottom chord nodes 7 are spaced apart from one another along the bottom chord 3. Preferably, the bottom chord nodes 7 are coincident in that the lines of force through respective pairs of webs 4,5 coincide with one another at the centerline of the bottom chord 3.

The nodes 6,7, in use, are situated at the intersections of the respective chord centerlines and the lines of force along the webs 4,5. It is important that this intersection occurs within the body of the top chord 2 and within the body of the bottom chord.

The nodes lie within the section depth of both the top chord and the bottom chord. It is preferable that a node lies within the middle third of its respective chord—this is the criterion for maintaining compression only or tension only in the section. If either node is outside the middle third (or, even worse, outside the total thickness) of its respective chord, then bending would be introduced. Bending would put the concrete top chord 2 into flexure requiring reinforcement which embodiments of the invention avoid. Bending in the bottom chord 3 is not possible when it is configured as a cable (or other element such as a chain) having no bending stiffness. If bending were to happen, then the geometry of the truss would be forced to change and there would be a large deflection under load.

The truss 1 has panels 8 comprising the internal spaces within the webs 4,5 and respective chords 2,3. The panels 8 may be solid or void. A bay 9 is defined as a section of top chord 2, a pair of webs 4,5 and the panel 8 bound within that section of top chord and the webs 4,5. The example of the truss 1 in FIG. 1 has eight bays 9: two sets of four opposing bays 9 with substantially vertical (normal to top chord) webs 4 and diagonal webs 5 going from the top chord 2 to the distal end of the normal web 4. Each of the two webs 4,5 meets at a respective bottom chord node 7.

The Bottom Chord and Web Interface

The bottom chord 3 is a tension member 3a having a centerline, in use, the bottom chord is always in tension and preferably comprises a steel cable or bundle of steel cables. The bottom chord tension member 3a has connection points to the main part at one end 2a of the top chord 2, at the ends of the webs 4,5 distal from the top chord 2 (i.e., at the bottom chord nodes 7) and at the other end 2b of the top chord 2.

Main Part End Connections

The connection points to the main part at the ends 2a,2b of the top chord provide the end connections for the bottom chord 3. The connection points at the ends 2a,2b can be configured with standard components familiar to those working in the concrete structure industry. The connection points are configured to maintain a coincident node for the bottom and top chord centerlines. Any anchoring at the connection points should be located where the top chord centerline CL intersects with the bottom chord centerline.

The following are two examples of end connections or anchors, see FIGS. 19a,b and 20a,b. Further variants are also shown in FIGS. 23, 24a, 24b, discussed later below.

In FIGS. 19a,b the bottom chord tension member 3a comprises typical pre-stress cables/wires (which do not necessarily have to be pre-stressed to any particular force level other than to make them tight to the concrete but may be pre-stressed in some embodiments to further reduce material use). The cables 3 are terminated with typical pre-stress end anchors 12. Preferably a channel or groove 13 is printed in the end 2a of the top chord concrete so that the cables and anchor are seated in the concrete and maintain a coincident node for the bottom and top chord centerlines.

In FIGS. 20a,b, the bottom chord tension member 3 comprises steel cables in the form of a steel rope, similar to the material used in cranes, hoists and elevators. The ends of the steel rope are provided with load bearing hooks or eyes 14. The hooks 14 can hook the cable over a steel bar anchor 12 at the ends 2a,b of the truss 1 and is similar in other respects to the FIG. 19 connection. The steel rope example can use one or more turnbuckles along the length of the rope to tension/shorten the rope length to tightly seat the rope 3 in the end anchorages 12 and the web channels or grooves 10.

Web End Connections

Referring to FIGS. 11 and 12, the ends of the webs 4,5 are profiled to prevent rubbing with the bottom chord cables 3.

The connection points to the main part at the ends of the webs 4,5 distal from the top chord, i.e., at the bottom chord nodes 7, carry a shoe 10 or bracket or other convenient means for capturing the bottom chord 3 at the respective node. Preferably and usually, respective pairs of the bottom chord nodes 7 are coincident with one another. It is not essential for the bottom chord nodes 7 to be coincident so the ends of the webs 4,5 can be spaced apart. The bottom chord nodes 7 can be offset from coincident by a predetermined distance to allow for incorporation of the groove 10 (connection detail) or shoe 10. It is possible for the webs 4,5 to intersect at a point which is offset from the bottom chord centerline. This arrangement may not be preferable but offers potentially useful flexibility when designing the channel/groove/shoe 10 which restrains the bottom chord 3.

In one embodiment, the shoe 10 has a pin insert which can be located at the node before the concrete has fully hardened. The shoe 10 sits at the ends of the webs 4,5 and restrains the bottom chord 3 from lateral movement. The shoe 10 preferably has a rounded (half-moon horizontal profile) contact surface so that the cables 3 can pass over the shoe with minimal friction—thus the cables can slide with respect to the shoes 10. The bottom chord is restrained from lateral movement at the ends of the webs 4,5 by the shoe structure and the bottom chord can slide with respect to the shoes—there is no bending moment between the bottom chord 3 and the webs 4,5 of the main part.

In some embodiments, the shoe at the connection points on the ends of the webs 4,5, is a channel or groove 10 formed as an integral part of the ends of the printed webs 4,5 so that the bottom chord cables 3 sit within the ends of the webs 4,5 distal from the top chord 2. Preferably, the bottom chord cables 3 are encased in a plastic or steel duct 11 which avoids the cables rubbing directly on the concrete webs 4,5. The cable duct 11 with the tension member 3 inside sits in the web channel or groove 10 so no discrete shoe or positive connection is required at the web connection points.

The bottom chord cables 3 run in between bays 9, preferably as a bundle but without any specific connections there-between. The quantity and size of the cables can vary. Standard (e.g., 12.5 mm, 15.7 mm) diameter steel cables can be used, the same as those used for post-tensioning concrete which would be familiar to precast concrete manufacturers. The cables can be coated to provide enhanced fire protection in most circumstances, unless the beams are used in external locations (in which case they would only need corrosion protection). This fire protection is to be determined but could be achieved using a post-applied intumescent paint, or other spray-on coating.

In the case of using a duct 11 to contain the cables 3, the duct 11 can also provide the necessary fire and corrosion protection. The cables can be individually coated in the factory prior to being bundled during the truss assembly.

The cables 3 could be replaced with a chain (or other element possessing no bending stiffness), solid bars, or steel flats or other suitable high tension materials such as carbon fiber rods and other composite materials such as glass-fiber reinforced plastic, graphite-fiber reinforced polymer and fiber reinforced plastic. Whilst the strength of the material is significant, it is the stiffness (Young's modulus) which is potentially more important, so no minimum yield strength is specified. In practice, with post-tension cables, the yield strength will be 1860 MPa, far higher than is actually required in this application.

Preferably, the bottom chord 3 is curved (or at least the location of the bottom chord nodes 7 follows a curve) and the top chord 2 lies substantially flat, in its main plane M. The webs 4,5 transfer shear between the top and bottom chords but because the bottom chord 3 is curved, or at least lies below, in use, the top chord, the top chord 2 and webs 4,5 always stay in compression under uniformly applied gravity loads.

If cables 3 are used for the bottom chord 3, then they will become straight between nodes when the truss is loaded, i.e., the bottom chord ends up being faceted, and the location of the nodes 7 follows a curve.

Truss Geometry

Assuming the load applied to the truss 1 is predominantly uniformly distributed (typical for trusses/beams that support floors for example), the truss 1 is symmetrical about the centerline and a center vertical web 4 can be omitted.

In general, the 3D printing technique allows infinite variability in beam length, depth and width. In practical terms, the depth of the truss cannot be less than a certain minimum below which the top and bottom chords would merge to become a single section once again. However, the specific minimum depends on the forces that the top and bottom chords must resist. The top chord is horizontal, the bottom chord is curved. The specifics of the curve are tailored to suit the beam design loading conditions. For a uniformly applied load, a catenary curve, or parabolic curve would be used. The specific locations of the bottom chord nodes (the web 4,5 to cable interface) follows a catenary curve in FIG. 7. The curve can be varied to suit different loading scenarios so could be a parabolic, an arcuate or even a triangular distribution, if the beam loading is predominantly a point load, for example.

The webs 4,5 are positioned to remain in compression under load. The pattern is similar to the Howe truss, with verticals at each truss node. The orientation of the diagonals is symmetrical about the truss mid-point. To the left side of the mid-point, the diagonals are inclined upwards from left to right. To the right side of the mid-point, the diagonals are inclined downwards from left to right. The web members are positioned on the centerline of the top and bottom chords.

Additional bracing can be provided to improve buckling performance of the webs 4,5, if necessary, by inclining the webs 4,5 in section as well as in elevation. In this scenario, the webs 4,5 would be doubled up to provide this effect. Doubled-up webs 4,5 can be 3D printed with the panels 8 forming either a solid pyramid panel between web pairs where the panels 8 are inclined to one another at a large angle, e.g., over 20 degrees or so, or as a pair of distinct panels where the panels 8 are inclined to one another at a shallow angle, e.g. under 30 degrees or so. The limiting factor to printing the panels as two discrete panels or as a solid pyramid is whether the printed structure can support its own weight (when printing as discrete panels), the solid pyramid is self-supporting.

In FIG. 7, a single line is used to indicate the bottom chord 3 which comprises steel cables. The cables are continuous over the web member supports and terminate or loop around at the two ends of the truss 1. FIG. 7 shows the cables as faceted from point to point although they will have a slight sag, catenary, due to their own self-weight. FIGS. 9-12 show the individual cables making up a bundle.

Figure 8:
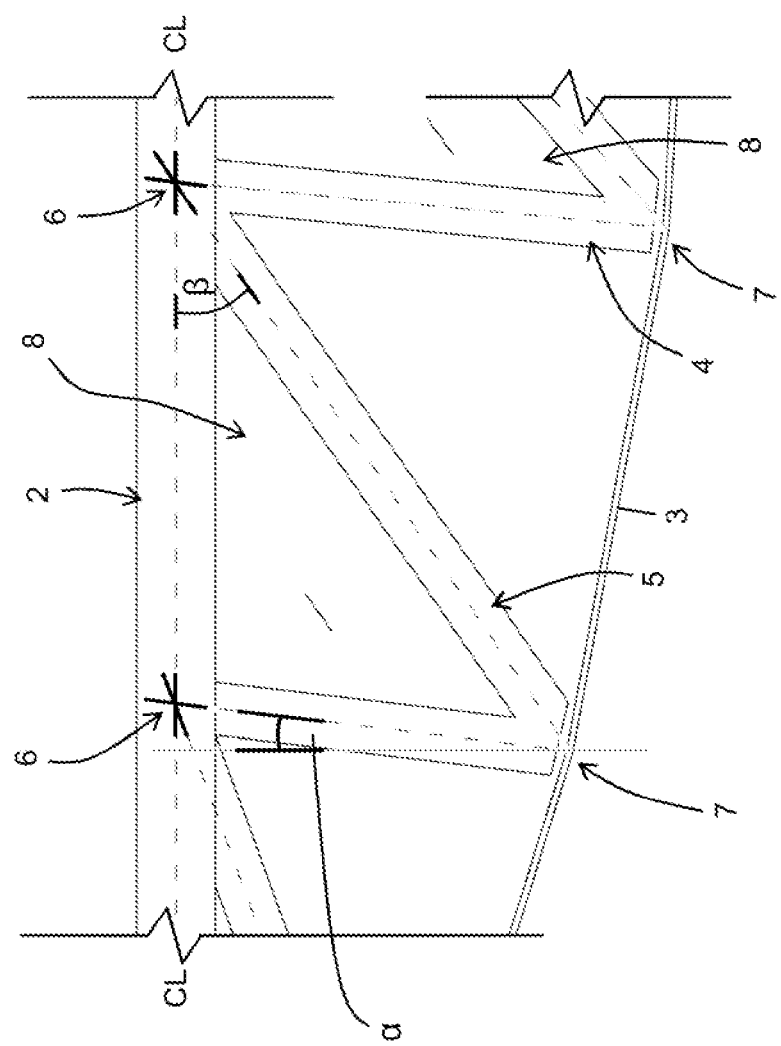
FIG. 8 is a side elevation view detail of the truss of FIG. 7.

The spacing between bays 9 of the truss 1 is variable although the optimum is expected to be achieved where the inclination of the diagonal webs 5 is close to +/−45 degrees. Referring to FIG. 8, the diagonal webs 5 should be within the range of 30-60 degrees from the centerline of the top chord 2. If the design of the truss pushes this internal angle (beta) outside the range of 30-60 degrees from the centerline of the top chord 2, then another bay 9 should be added or removed to the design—If beta is less than 30 degrees then a bay should be added and if beta is greater than 60 degrees, then a bay should be removed.

The "vertical" webs 4 should be normal to the top chord 2 ("horizontal" in common use), i.e., angle alpha within the range of +/−15 degrees from normal.

The span L and beam depth H can be varied but for typical building applications the length L will vary between 5 m-20 m with the depth H varying between perhaps 0.5 m and 1.5 m. In certain circumstances, e.g., supporting a column transfer in a large space e.g., over a conference room, the 1.5 m depth could be exceeded.

The thickness of the top chord 2 can be limited to, for example, a maximum of 20% of the total depth H, in order to prevent the top and bottom chords coalescing.

In FIG. 7, H is 1 m deep so a 200 mm thick top chord is used—the top chord width can be varied to suit the load.

In the example of FIG. 7, the webs are 50-150 mm square, the top chord 2 has a 200 mm thickness and the top chord has a width of 200-1000 mm. The bottom chord comprises a bundle of steel cables, shown roughly to scale in FIG. 12.

It is a design consideration to maximize the distance between the centerline of the top chord and the centerline of the bottom chord, to help maximize potential loading.

The thickness of the panel between the webs 4,5 and the top chord 2 is typically a few millimeters (2-20 mm) and corresponds to the dimensions of the printer head/nozzle P. The web thickness will typically be larger in the event that it is a single thickness panel 8 (see FIG. 21), with the thickness of the webs 4,5 and the width of the top chord 2 being related by an integer multiple of the printer head width. E.g., printer head of 50 mm, web width of 150 mm, top chord width of 700 mm. The method of manufacture (with 3D robotic printer) is described below.

The angles at the intersections between webs 4,5 and between webs 4,5 and the top chord 2 are shown as sharp corners but this will depend on the resolution of the printing nozzle/head P. If the nozzle is thick for a higher printing speed, then the intersections will become smooth curves instead of sharp corners (higher resolution).

The span L of the top chord 2 may be slightly domed but the coincident nodes 6 should remain planar (on the main plane M of the top chord) and within the section of the top chord 2. The top chord could be domed or pre-cambered within these limits.

Examples of the invention provide a concrete truss 2, preferably formed by 3D printing at least the webs 4,5. The truss geometry is specifically tailored to result in the top chord 2 and all of the webs 4,5 (the main part) only ever being in compression, in use, with the bottom chord only ever being in tension. The web configuration: web lengths and angles, can be readily varied by simply printing the webs 4,5 on to the top truss 2—see description below on method of manufacture.

Figure 16A:
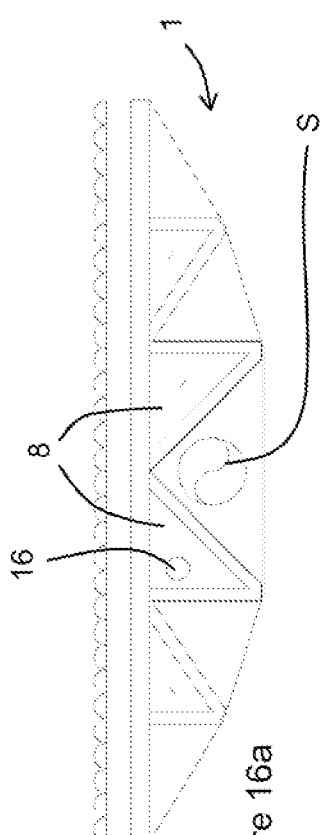
FIGS. 16a-d are side elevation views of trusses embodying the present invention.
Figure 16B:
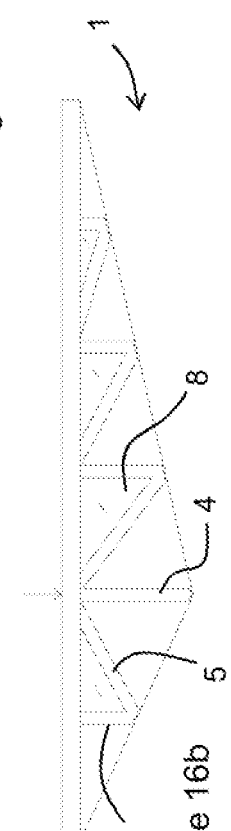
Figure 16C:
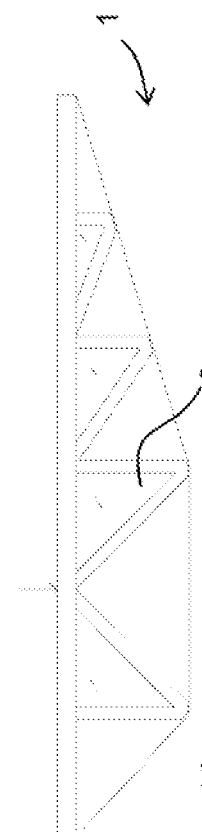
Figure 16D:
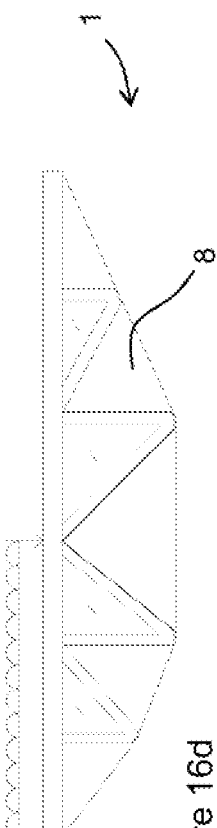

The curve geometry (of the bottom chord 3) may lead to additional efficiencies in some situations so comprise another mechanism by which the design can be fine-tuned depending on the load bearing and form factor requirements. Referring to FIGS. 16a . . . d, the geometry of the bottom chord 3 and webs 4,5 should reflect the type of load to be applied. A uniform load (FIG. 16a) would require a symmetrical curved bottom chord. A point load (FIG. 16b . . . c) would require a linearly varying bottom chord geometry, with the maximum distance between chords at the position of the point load. In FIG. 16d the load is uniformly applied on the left and the bottom chord follows a curve under the loaded section but on the right side, which is less loaded, the bottom chord follows a straight line. The invention does not require the bottom chord to be curved but the expectation is that the overwhelming majority of floor beams are designed for uniform loads, so this would be a common case.

In FIG. 6, there are trusses which act as secondary beams and trusses which act as primary beams. The secondary beams being configured to take a uniformly distributed load (floor slabs) and the primary beams to take a central point load (an intermediate truss).

Integrally Formed Main Part

The top chord 2 and the webs 4,5 together comprise the structural "main part" and these structural elements are designed to be only in compression, in use. Preferably, the main part is formed as a single unit from homogenous material, preferably concrete. When 3D printed, the main part can be printed in a continuous printing action, i.e., without interruption of printing. The top chord 2 can be either printed using the same printer head P as the webs 4,5 or can be poured/printed using a larger nozzle than the printer head P to achieve a faster print time.

Modular Main Part

Figure 17A:
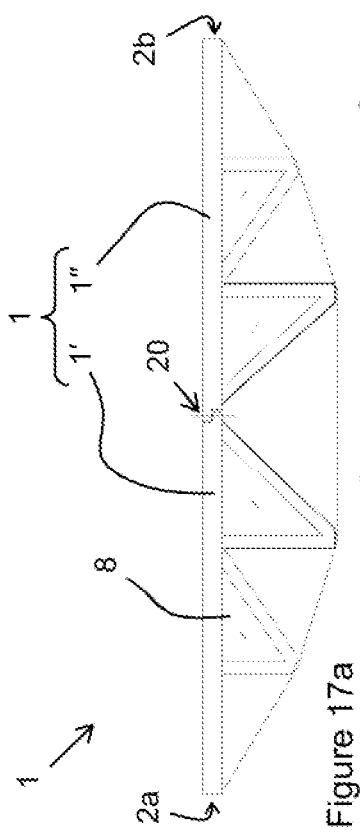
FIGS. 17a-b are side elevation views of trusses embodying the present invention.

Conveniently, the main part is configured as a composite assembly of single unit bays 9—see FIGS. 17a,b. FIG. 17a shows a modular main part having two symmetrical pieces (apart from the joint 20 at the top chord 2). The bottom chord 3 would be applied on or adjacent to the deployment site. The joint 20 comprises at least a pair of lip and pin joints to interconnect the two halves 1' and 1".

Figure 17B:
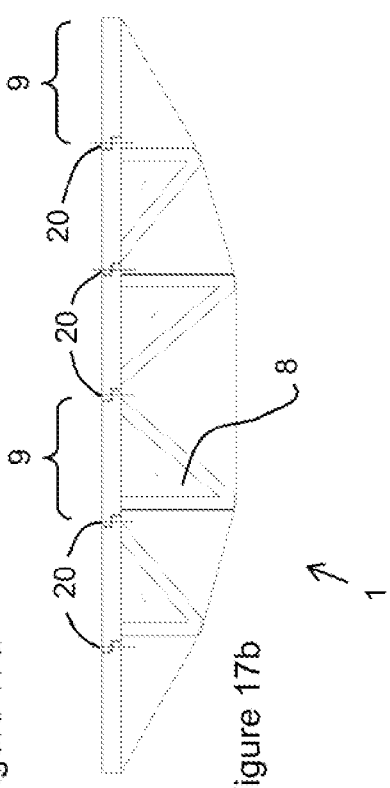

In FIG. 17b, the truss 1 has six discrete bays 9. The end bays 9 have no webs and comprise only a section of the top chord 2, the mid-bays 9 each comprise a self-contained bay 9 with section of top chord 2, vertical and diagonal webs 4,5. Each bay 9 can be formed independently and then readily assembled on site. The connection between adjacent bays 9 is at least a pair of lip and pin joints.

When 3D printed, each of the parts (the half-trusses of FIG. 17a or the modular bays 9 of FIG. 17b) can be printed in a continuous printing action, i.e., without interruption of printing.

Floor Slabs

The truss is restrained from out-of-plane deformation (e.g., buckling of top chord or torsional effects) by the connection of the floor slabs 15 to the top chord.

With this geometry, the compression members can be 3D printed without requiring steel reinforcing bars. The tension bottom chord is made using steel cables which only require tension capacity and not compression resistance. Therefore, this approach solves the problem of creating a 3D printed concrete structure which can resist bending loads. The length of the beam, the size of the chords and web members, the inclination of the web members are all customizable depending on the requirements of any given design.

Floor slabs 15 can be precast concrete, timber or cross laminated timber panels but these cannot span as far as concrete slabs so an intermediate truss may be required—see FIG. 6.

Structural Assembly

In FIG. 5, an assembly embodying the present invention comprises a pair of trusses 1 embodying the present invention which span the columns of a building and precast concrete slabs are fixed to or laid on the trusses 1.

In FIG. 6, an assembly embodying the present invention comprises five trusses embodying the present invention deployed in a building on columns. The floor beams are cross laminated timber panels, but these cannot span as far as concrete slabs, so an intermediate truss is required. The intermediate truss 1 is supported by a pair of primary beams which support the central point load of the intermediate truss. The profile of the bottom chord of the primary beams can be tailored and optimized for the central point load.

FIGS. 13 to 15 show the top chord 2 in section as a central or intermediate truss with a pair of floor slabs pinned into the top chord 2. The floor slabs are precast hollow-core slabs with tie reinforcements which can be readily pinned to the top chord 2.

In FIG. 13, a tie reinforcement 14 is drilled into the top chord and fixed with an epoxy resin after the 3D printed concrete has reached full strength, e.g., on site. This is just one option for connecting precast floor slabs. Vertical tie connections are provided at regular spacings along the top chord 2.

In FIG. 14, the steel insert 14 in the top chord 2 is in situ before the 3D printing starts and the print head moves around the steel insert to envelope it in material and avoid the need for drilling. This provides another method for providing a connection to precast floor slabs.

In FIG. 15, the section of the top chord of the 3D printed top chord is non-rectangular in shape and is provided with steps within which steel inserts are sited before printing begins. The slopes of the section are what can be readily achieved with 3D printing on a flat surface. A more complex channel type surface could be used which includes a recess so that the inverted T-shape can still be achieved.

The top chord can have any section shape, see FIGS. 9 and 10 which show a rectangular section, as long as there is a flat surface to support the floor slabs (which are prefabricated concrete slabs, dowelled laminate timber (DLT) or cross laminate timber (CLT) panels or the like).

Method of Manufacture

Referring to FIGS. 18a-e, the preferred method of manufacture is by printing the concrete, i.e., 3D printing. The truss 1 has a planar top chord 2 so the design-specific geometry is created by 3D printing the truss in an "upside-down" condition starting with the top chord as the base onto which printing occurs. This orientation of printing is especially preferred and convenient since no specialized jig or bed to receive the "upside-down" top chord is required. Further, gravity-drop printing directly onto the top chord is possible in this configuration.

The printer P creates the planar top chord as a slab with a rectangular cross section. The centerline CL runs through the central main axis of the top chord and there is a main plane M of the top chord 2 lying along the centerline CL, in to and out of the paper, in FIG. 7.

Figure 18A:
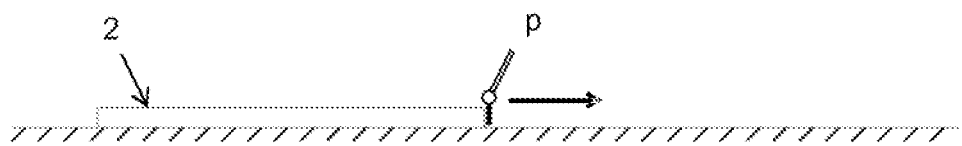
FIGS. 18a-e are side elevation views showing stages of a method of manufacture embodying the present invention.

The printer prints the web members in sequence on to and along the centerline directly on to the "upside-down" top chord 2. FIG. 18*a* shows the top chord 2 part-printed and being deposited from print head P. Whilst the printer can be started and stopped, printing an element then moving to the next location and starting printing again, such intermittent (on/off) use can cause problems to the printer concrete flow in the nozzle, so it is preferred if printing is in one continuous flow.

Figure 18B:
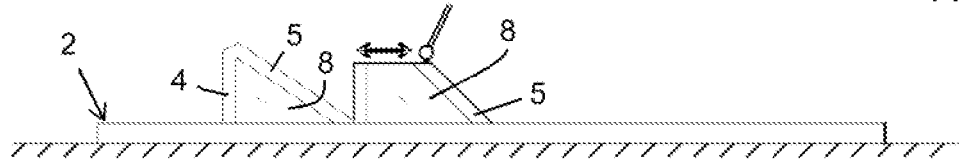
Figure 18C:
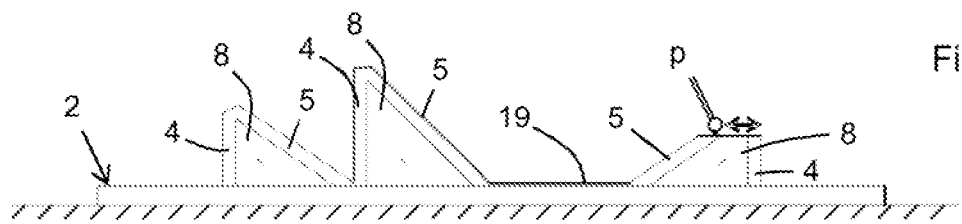

The webs 4,5 are printed above and along the centerline directly on to the top chord 2. FIG. 18*b* shows the first bay 9' toward one end of the top chord completed and the adjacent bay 9" being completed. The final bead of concrete will be printed as the printer head P departs the apex of the completed bay and deposited along the diagonal sloping toward the middle of the top chord, past the middle and toward the other end of the top chord where the next bay is started as shown in FIG. 18*c* (including the trace of bead 19 as the printer prints continuously).

Figure 18D:
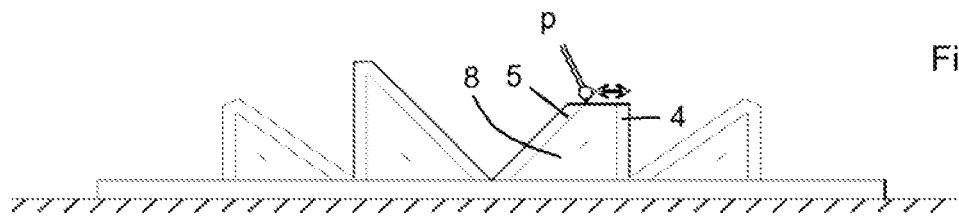

FIG. 18*d* shows the first bay toward the other end of the top chord completed and the adjacent bay being completed toward the middle of the top chord. The final printing action will be to finish printing at the apex of the final web pair.

Figure 18E:
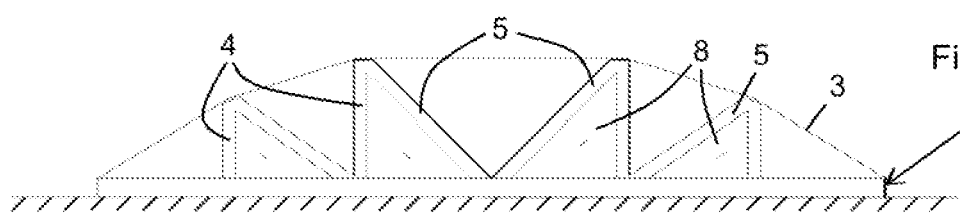

FIG. 18*e* shows the tension element, preferably a steel cable bundle draped over connection points at one end of the main part, at the four ends of the webs distal from the top chord and at the other end of the main part. The four ends of the webs distal from the top chord 2 are the apexes of the bays, the ends of the webs 4,5, where the shoes 10 are fitted. Steel bars could be used instead of cables—bars resist both tension and compression. Cables are proposed because they can be draped over the 3D printed concrete during the manufacturing process.

In another method of manufacture embodiment, the substantially rectangular top chord 2 is cast in a mold with the 3D printing of the web members to follow on top of the "upside-down" top chord. The webs 4,5 are then printed above and along the centerline on to the top chord.

It is noted that most of the tailoring of the structural characteristics of the main part (top chord and webs) are undertaken by manipulating the configuration of the webs 4,5 and the locations of the bottom chord nodes 7. So, it is extremely convenient and very flexible to be able to print the webs 4,5 in whatever configuration is called for directly on to the "upside-down" top chord 2. The printer P can be programmed to deliver the desired web configuration and the program can simply be changed for the next "print run" and a different web configuration delivered. Embodiments of the present invention facilitate an extremely adaptable mechanism for delivering customized or tailored truss structures 1. Controlling and delivering the critical web configurations by 3D printing to order on to the top chord 2 and providing a bottom chord 3 in the form of an easily draped, attached and tensioned tension member provides a technically advantageous method of manufacture. The top chord can be pre-formed with a thickness and width which can again be tailored to suit the load conditions and truss height H.

Continuous Printing

As previously described, it is preferable to be capable of printing the entire main part (or for modular embodiments an entire bay 9) in one continuous flow. Embodiments of the method of manufacture print are capable of printing continuously, without interruption until that part is printed. Preferably the webs 4,5 at one end of the top chord 2 are printed first to produce a triangular panel or bay 9 before moving onto the next bay 9. The direction of printing should follow the diagonal slope of the panel so that the printer head P does not need to stop printing. As seen in FIG. 18*a* . . . *d*, once one side of the top chord has been completed, the printer head P traverses across to start printing at the other side, other end, without stopping the flow of printer material (concrete) and then prints back to the mid-section, one bay 9 after another. The printing process does not need to be interrupted to install reinforcements or the like.

Embodiments of the invention provide a method of manufacturing a truss structure with a span L and a beam depth H comprising: providing a planar top chord with a central main axis and a centerline; printing a bay comprising a pair of normal and diagonal webs above and along the centerline on to the top chord, the webs being separated by a panel, wherein the printing of the bay is complete when the normal and diagonal webs intersect one another.

Preferably the method of manufacture prints another bay above and along the centerline on to the top chord and wherein the printing of the bay is complete when the normal and diagonal webs intersect one another.

Conveniently, the method of manufacture prints one or more bays along the centerline on to the top chord toward one end of the top chord; and subsequently prints one or more bays along the centerline on to the top chord toward the other end of the top chord.

Forming the main part comprises printing the bays on to the top chord to form a unitary main part or joining modular bays together to form a composite main part.

Providing the planar top chord can comprise: printing the top chord, using a pre-cast top chord.

The top chord is printed when "upside-down", assembled "upside-down" and completed "upside-down" by applying and optionally tensioning the bottom chord to the connection points. The truss is then inverted the "right way up" for deployment. The connection points are at one end of the main part, at the ends of the webs distal from the top chord and at the other end of the main part.

During the 3D printing process, the panels 8 will be printed but only with a thin deposition of concrete (thickness of the printer head P). The thin panel 8 helps support the weight of the diagonal web 5 whilst the webs 4,5 are being printed and before the concrete has hardened. In principle, when using a more rapidly hardening print medium, the panels 8 can be omitted.

If the "thin" panels are not omitted, then they will be in place between the webs 4,5. The panels 8 can be knocked out (machined out) entirely or provide with a through-hole 16 to allow for services S to be threaded through the truss. Services S can also be threaded through the voids between webs/bottom chord as shown in FIG. 16*a*. The panels 8 are not load bearing arising as a result of the printing process.

As described above and in relation to varying geometries depending on likely load characteristics, the relative lengths of the web members form the curved geometry for the tension cables. The cables are held in place over the web members, with minimal (pinned) connections and are terminated at the ends of the truss. Each of the components (e.g., top chord 2, webs 4,5, bottom chord 3) can be individually tailored in terms of geometry. A planar top chord top surface can support the floor slabs. Once the concrete has reached a certain specified strength threshold, the tension cables 3 are tightened to hold the hybrid truss together. Enough tension is applied to engage the steel tension element 3 when the assembly 1 is picked up and maneuvered. The truss 1 is not a "post-tensioned truss", although that could be a development to assist with deflection reduction i.e., applying a pre-camber.

Further Variants

FIGS. 21, 22a and 22b illustrate that the web panels 8 can be printed as single thickness web panels 8 and not necessarily e.g., with a rib or thickening at the edges. Similarly, the webs 4,5 themselves may equally be printed as single thickness webs 4,5. In other embodiments, the webs 4,5 and/or web panels 8 comprise variable thicknesses; and/or the webs 4,5 and/or web panels 8 comprise ribs or thickening at one or more edges.

FIGS. 23 and 24a, 24b illustrate an alternative end connection where the (preferably printed) part of the top chord 2 separates to create, diverges or otherwise forms a pocket, channel or groove 13 in the center, at its proximal end 2a, which can be filled with securing compound such as grout or poured concrete. The specific shape of the pocket, channel or groove 13 (the interface between the 3D printed material and the grout) can vary depending on circumstances. The figures show it as a horseshoe-shape but it could e.g., be straight cut, or a more angular interface.

In FIG. 23:

101 shows a preferred embodiment where the top chord total flange width increases, extending away from the center, to open up a gap in the middle at the proximal end 2a as shown, forming the pocket, channel or groove 13 whilst the material width remains substantially constant. This means that the width of the 3D printing material stays substantially the same, so that the print path can remain continuous without lifting off or starting/stopping.

102 shows the typical, substantially constant material width of the top chord 2, which remains the same at the proximal end 2a of the top chord and away from the end 2a, at 102.

103 shows the line of the bottom (tension) chord 3, below the beam.

In other embodiments, the total width of the beam is constant (or substantially constant when comparing the end and middle of the beam) with a reducing material width, i.e., with the pocket, channel or groove 13 opening up in the middle and the sum of the material widths of the "arms" on either side of the pocket 13 is less than the typical total width of the beam.

The securing compound, such as non-shrink concrete or grout, can be poured into the pocket, channel or groove 13 after the anchor end connector 12 is positioned. The anchor end connector 12 itself may comprise standard components e.g., from post-tensioning industry, or bespoke components. There will also typically be the need for steel reinforcing bars to be positioned locally at the end of the anchor end connector 12. This is to overcome local compression and tension forces which arise from the high stress applied directly behind the face of the anchor 12 and allow the forces to be distributed to the full width of the top chord 2. The steel reinforcement might be a helical arrangement (which is usually provided by the manufacturing of the post-tensioning components), but it could also be mesh reinforcement sized for this purpose preferably in at least two layers (close to the top of the surface and close to the bottom).

The shape of the curve at a distal innermost end 13a of the pocket 13 is significant because this location has a peak stress concentration due to the local transfer of force to/from the anchor plate and is preferably a semi-circular curve to reduce the stress concentration which would occur with a sharp angle or corner, but it could also be any other shape, such as rectangular or triangular (not shown), or shaped so that the interface between the grout and the (preferably 3D printed) material is predominantly perpendicular to the line of action of the bottom (tension) chord 3 (also known as a tendon and may comprise prestressing wire).

Figure 25:
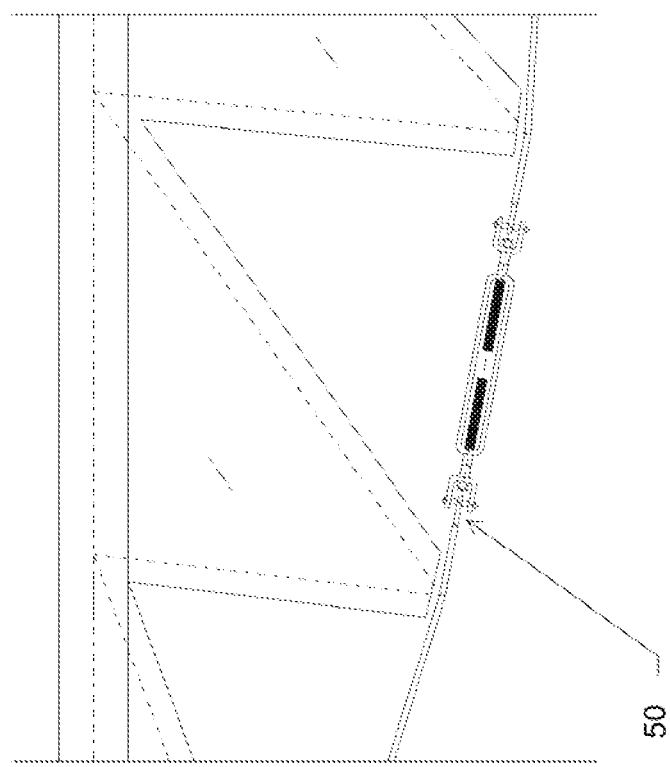
FIG. 25 is a side elevation view of a truss embodying the present invention.

FIG. 25 illustrates an optional tensioning device 50, such as a turnbuckle, on the bottom chord 3.

The tensioning device 50 is configured to tighten, or re-tighten, the bottom tension chord 3. The tensioning device 50 enables varying the pre-tension force in the bottom chord 3 in order to adjust the precamber of the beam. The connection type is chosen to suit the tension element, e.g. if a standard post tensioning (PT) strand is used then the connection might be a wedge type, whereas if steel wire rope is used then the connection might be a hook.

For large beams with lots of tendons/prestressing wires, the size of the required anchor connection 12 can be larger than the thickness required for the top chord 2. In these embodiments, the top chord 2 remains substantially planar, but by slightly inclining the centerline of the top chord 2 downwards for the outermost bay, the point of intersection of the top chord 2 and the bottom chord 3 at the extreme ends might be slightly below the general top chord 2 centerline.

General

The claimed invention is applicable to materials other than concrete which share similar characteristics in that the material is suitable for additive manufacturing (3D printing) and is useful for compression-only structures but is not suitable to make a bending structure, such as a beam, as the material does not perform well in tension without incorporating some form of reinforcement. The bottom chord can be any material, like steel, which is suitable for use in tension. The claimed invention is applicable to concretes with and without the presence of aggregates.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. Further, features disclosed in the text and/or drawings of the specification can stand alone or may be combined, in any combination, with one or more other features disclosed in the text and/or drawings of the specification where there is no conflict between those features.

Protection may be sought for any features disclosed in any one or more published documents referenced herein in combination with the present disclosure. Although certain example embodiments of the invention have been described, the scope of the appended claims is not intended to be limited solely to these embodiments. The claims are to be construed literally, purposively, and/or to encompass equivalents.

Representative Features

1. A truss structure with a span L and a beam depth H, the truss having a main part comprising a substantially planar top chord with a longitudinal centerline and webs connecting between the top chord and a bottom chord, the top chord being separated from the bottom chord by the webs,
   there being a top chord node where each web intersects with the centerline of the top chord and a bottom chord node where each web meets the bottom chord,
   wherein at least two of the top chord nodes coincide with one another along the top chord and wherein, in use, the elements of the main part are in compression and the bottom chord comprises a tension member.

I claim:

1. A truss structure with a span L and a beam depth H, the truss comprising:
   a main part,
   wherein the main part comprises:
      a bottom chord;
      a planar top chord with a longitudinal centerline and having webs connecting between the top chord and the bottom chord, the top chord being separated from the bottom chord by the webs,
   wherein
   each web of the webs intersects with the centerline of the top chord at a top chord node,
   wherein each web of the webs meets the bottom chord at a bottom chord node,
   wherein at least two top chord nodes coincide with one another along the top chord;
   wherein the bottom chord comprises a tension member,
   wherein the bottom chord and the top chord are in compression, and
   wherein the webs are comprised of a 3D-printed additive material; and
   a shoe being provided at an end of at least one web of the webs distal from the top chord, said tension member being in a sliding relationship with respect to said shoe, said bottom chord being concurrently restrained from lateral movement relative to said at least one web by said shoe.

2. The truss of claim 1, wherein the tension member has connection points to the main part at one end of the main part, at the ends of the webs distal from the top chord and at the other end of the main part.

3. The truss of claim 1, wherein the bottom chord prescribes a profile between at least two connection points,
   wherein the profile is one or a combination of facets and curves, the curves comprising an arc, a catenary curve, or a parabolic curve, and
   wherein the profiles of one or a combination of the bottom chord and the webs are tailored to suit the truss design loading conditions.

4. The truss of claim 1, wherein at least a pair of webs connect between the top chord and the bottom chord, with the bottom chord nodes of the pair of webs being shared.

5. The truss of claim 1, wherein the webs are in pairs and comprise a normal web and a diagonal web with a shared bottom chord node, the normal web being normal to the top chord or within the range of +/−15 degrees from normal and the diagonal web being 45 degrees from the top chord or within the range of 30-60 degrees from the top chord.

6. The truss of claim 1, wherein the material of the main part is, in use, in compression and is selected from one or a combination of: an additive material, a mortar and a concrete including aggregates.

7. The truss of claim 1, wherein the main part is a composite of two or more main part elements joined, in use, in compression.

8. The truss of claim 7, wherein one or more of the main part elements is a bay comprising: a section of the top chord and at least a pair of webs connecting between the top chord and the bottom chord, with the bottom chord nodes of the pair of webs being shared.

9. The truss of claim 7, wherein a top chord node of one main part element is coincident with a top chord node of an adjacent joined, in use, main part element.

10. The truss of claim 1, wherein the webs and/or web panels comprise variable thickness webs and/or web panels; and/or the webs and/or web panels comprise ribs or thickening at one or more edges.

11. The truss of claim 1, further comprising a tensioning device for adjusting tension of the bottom chord.

12. The truss of claim 1, further comprising an anchoring end connector.

13. A structural assembly, comprising:
    the truss according to claim 1.

14. A method of manufacturing a truss structure with a span L and a beam depth H comprising the steps of:
    providing a planar top chord with a central main axis and a centerline; and
    printing a bay comprising a pair of normal and diagonal webs above and along the centerline on to the top chord, the webs being separated by a panel,
    wherein the printing of the bay is complete when the normal and diagonal webs intersect one another.

15. The method of claim 14, comprising the step of:
    printing another bay above and along the centerline on to the top chord,
    wherein the printing of the bay is complete when the normal and diagonal webs intersect one another.

16. The method of claim 14, comprising the steps of:
    printing one or more bays along the centerline on to the top chord toward one end of the top chord; and
    printing one or more bays along the centerline on to the top chord toward the other end of the top chord.

17. The method of claim 14, wherein forming the main part comprises printing the bays on to the top chord to form a unitary main part or joining the bays together to form a composite main part.

18. The method of claim 14, wherein providing the planar top chord comprises printing the top chord.

19. The method of claim 14, further comprising the step of:
    attaching a bottom chord to connection points of the main part, the connection points being at one end of the main part, at the ends of the webs distal from the top chord and at the other end of the main part and optionally tensioning the bottom chord.

* * * * *